Aug. 17, 1965  W. KASTEN  3,200,948

ANTI-ICING FILTRATION UNIT

Filed Oct. 12, 1960  2 Sheets-Sheet 1

INVENTOR.
WALTER KASTEN
BY
William N. Antonio
ATTORNEY

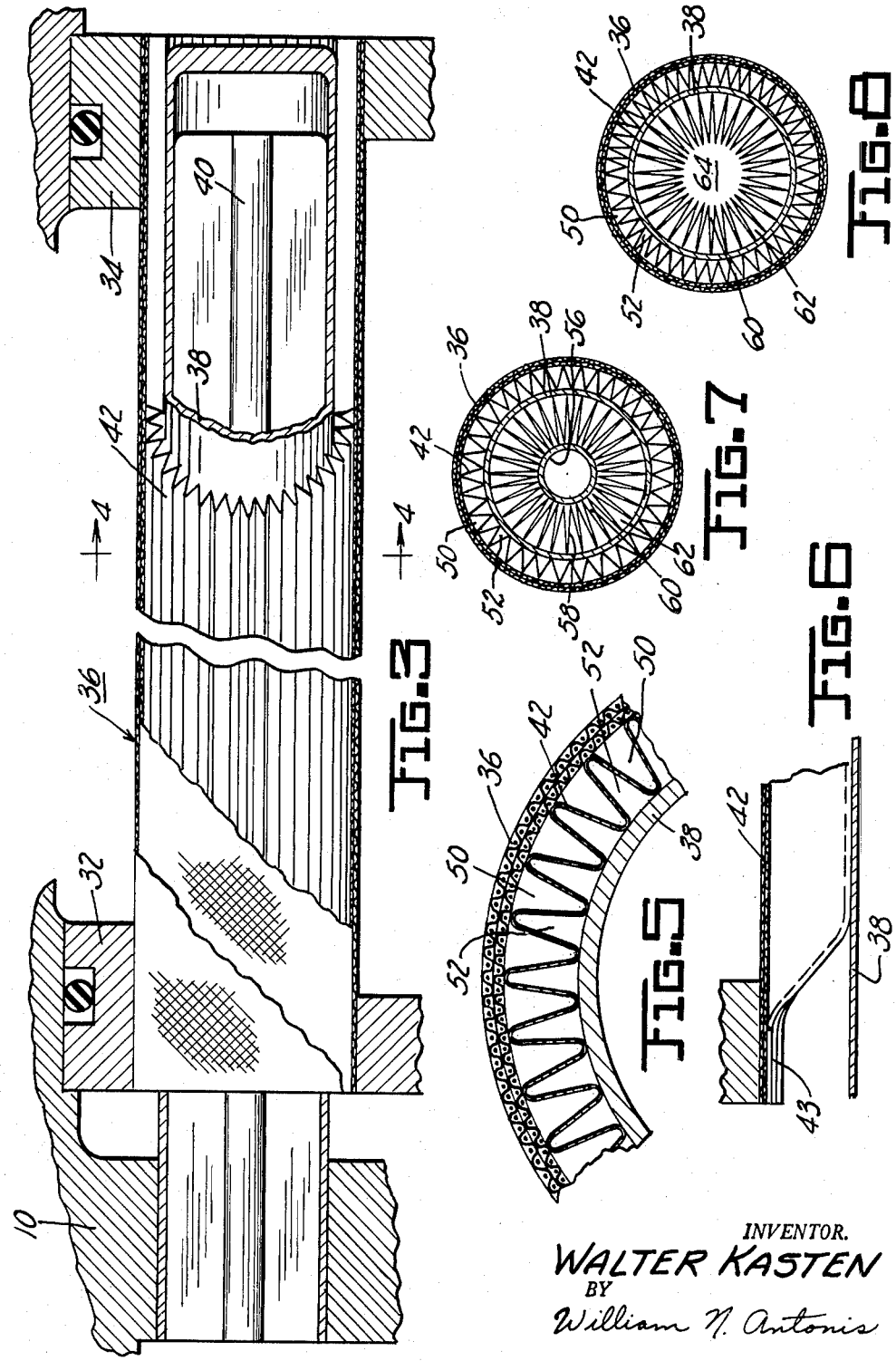

United States Patent Office 3,200,948
Patented Aug. 17, 1965

3,200,948
ANTI-ICING FILTRATION UNIT
Walter Kasten, Madison Heights, Mich., assignor to The Bendix Corporation, Madison Heights, Mich., a corporation of Delaware
Filed Oct. 12, 1960, Ser. No. 62,133
6 Claims. (Cl. 210—184)

The present invention relates to anti-icing filtration units of the type disclosed in my copending application Serial No. 814,617, filed May 20, 1959, now Patent No. 3,083,833, and Serial No. 848,659, filed Oct. 26, 1959, now Patent No. 3,097,165, and more particularly, to certain improvements relating thereto.

One of the objects of this invention is to provide a fluid filtering and heater device which has improved heat transfer characteristics over comparable known devices.

Another object of this invention is to provide a device in which all of the filtered fluid flows at least one full length along the heat transfer means regardless of which point it passes through the filtering means.

A still further object of this invention is to provide a device having an effective flow path for the filtered fluid along the heat transfer means which is three times as great as known comparable devices.

More specifically, it is an object of this invention to utilize a pleated element between a filter tube and a hollow heat transfer member which is arranged in such a manner that it will divide the filtered fluid into relatively thin streams, and will cause the filtered fluid to flow initially along the outer grooves of said pleated element towards one end of the hollow heat transfer member and then back along the inner grooves of the pleated element towards the other end of the hollow member.

Other objects and advantages will become apparent from the following description and accompanying drawings, wherein:

FIGURE 3 is an enlarged view, partially in section, with portions broken away for clarity of a single filtering element and the heat transfer means located therein.

FIGURE 5 is a enlarged sectional view of a portion of the filter element and the dual flow path heater tube construction;

FIGURE 6 is an enlarged section of the circumscribed portion 6 of FIGURE 1;

FIGURE 7 is a sectional view similar to FIGURE 4, showing another embodiment of the heat transfer means within the heater tube; and FIGURE 8 is a sectional view similar to FIGURE 4, showing a third embodiment of the heat transfer means within the heater tube.

Figure 1:
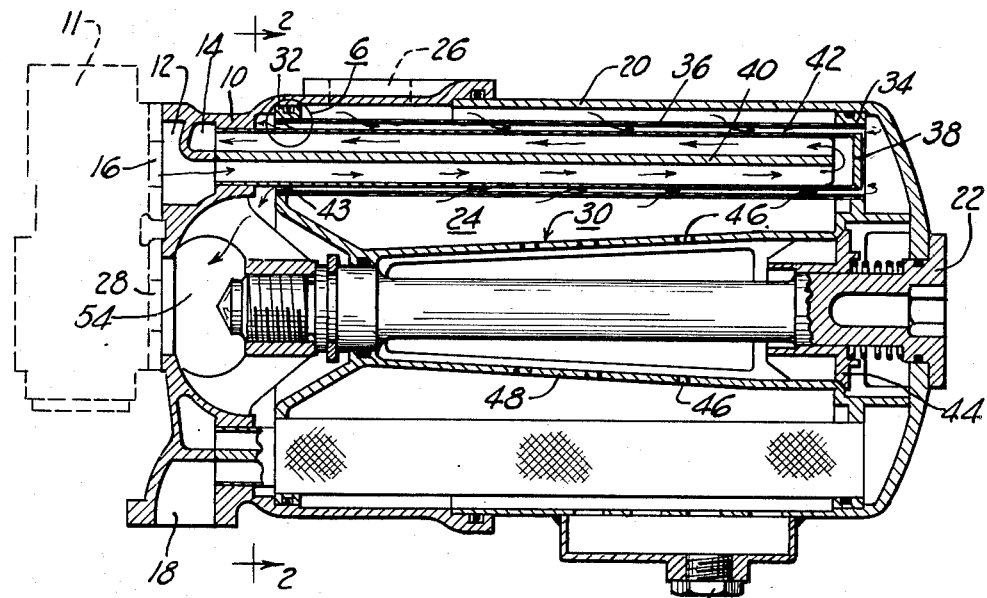
FIGURE 1 is a view in partial section of my anti-icing filtration unit.
Figures 2, 4:
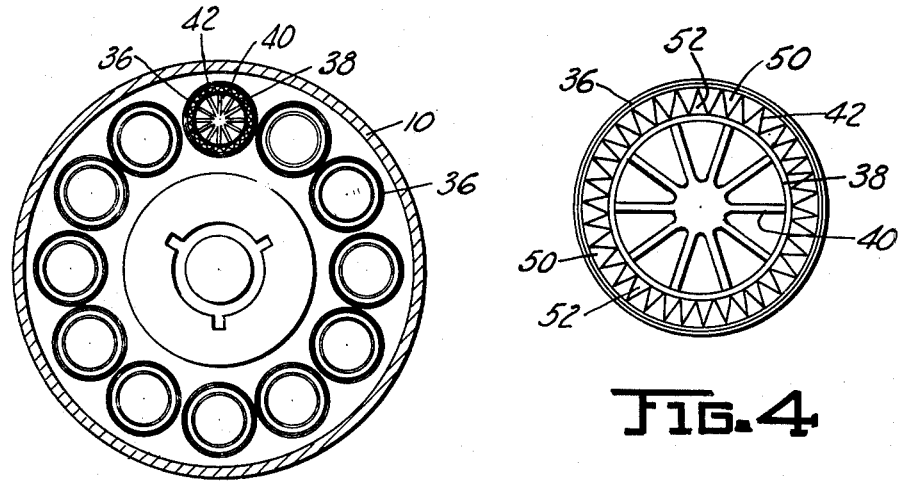
FIGURE 2 is a section taken on line 2—2 of FIG. 1, with only one of the filter elements fully sectioned.
FIGURE 4 is a section taken on line 4—4 of FIGURE 3.

Referring to FIGURES 1-6 of the drawings, it will be noted that my anti-icing filtration unit includes a head 10 having two annular chambers 12 and 14 which communicate with compressor bleed air inlet and outlet ports 16 and 18, respectively. A fuel bowl 20 is suitably connected to head 10 through means of a bolt 22 and forms a fuel chamber 24 therewith, said chamber communicating with fuel inlet and outlet ports 26 and 28. Located in the fuel chamber 24 is an assembly 30 which includes two retainer plates 32 and 34. A plurality of filter elements 36, which are open at both ends, are suitably connected to the retainer plates and are circularly arranged, as shown in FIGURE 2. These filter elements may consist of tubular screens, wire wound elements, ribbon elements or any other types of elements having reasonably good conductivity which could be made in a wrap-around or substantially cylindrical unit and attached to retainer plates 32 and 34. Located within each filter element 36 and suitably connected to head 10 is a hollow heater tube 38 which is closed at one end. An insert 40 having radial spokes extending from the center thereof is positioned within the cylinder so that one end thereof is spaced from the closed end of the heater tube and the spokes are in contact with the inner wall of the cylinder. This insert serves the purpose of directing flow within the closed end heater tube, as will be subsequently described. Between each of the heater tubes 38 and the filter elements 36 is located a corrugated (pleated) thin metal cylinder 42. The corrugations or pleats located at the open end of the heater tube 38 are crimped or crushed at 43, as shown in FIGURE 6, so that this end will terminate in a cylindrical tube having an outside diameter which is substantially equal to the external diameter of the corrugations. This, in effect, provides a stop and closes one end of the trough formed by the outer grooves of the corrugated cylinder 42. This corrugated cylinder may be brazed, welded, or otherwise suitably attached to the outer diameter of the heater tube 38, so as obtain a good heat transfer. The filter element 36 surrounds the corrugated cylinder 42 and is in contact with the outer pleated portion thereof. A by-pass valve 44 is located in retainer plate 34 for permitting, during clogged filtering conditions, flow of fuel from the fuel inlet port 26 to the lower open end of the filter elements 36, via a plurality of openings 46 in a tubular extension 48 of the assembly 30. A water drain plug 45 is provided for removal of any free water that may accumulate in the bottom of the bowl.

Operation of the unit will be as follows: Compressor bleed air (hot lube oil or any other suitable heating medium) passing through a suitable compressor bleed air control modulating valve 11, enters annular chamber 12 via air inlet port 16, flows down one side of insert 40 along substantially one-half of the internal effective area of the heater tube 38, reverses its flow at the closed end of the heater tube, flows up the other side of insert 40 along the other half of the internal effective area of the heater tube to annular chamber 14, and leaves the unit via air outlet port 18. The fuel to be filtered enters the fuel inlet port 26, flows through the filter elements 36 from outside-in and then into the outer grooves 50 of the corrugated metal cylinder 42. Since these outer grooves are closed at one end, due to the crimp 43, the fuel can only flow in one direction, namely toward the closed end of the heater tube 38, which, of course, is opposite the crimped end of the corrugated cylinder 42. The fuel then reverses its direction and flows along the grooves 52 formed by the inner surface of the corrugated cylinder and the outer surface of the heater tube. From there the fuel flows into chamber 54 and leaves the device through fuel outlet port 28. If a clogged filter condition occurs, all of the fuel will flow through by-pass valve 44 and into the inner grooves 52.

Instead of using an insert 40, having radial spokes, as shown in FIGURE 4, the heat transfer characteristics may be improved by utilizing an air outlet tube 56 and a pleated or finned metal cylinder 58 located inside of the heater tube 38, as shown in FIGURE 7. The tube 56 and cylinder 58 are spaced from the closed end of heater tube 38, similarly to insert 40. By suitably rearranging the porting in the head 10, compressor bleed air can then be directed to the annulus formed by the heater tube 38 and the air outlet tube 56, so that flow will be along both the inner and outer grooves 60 and 62 of the finned metal cylinder 58 and thence through air outlet tube 56. In order to prevent loss of heat, this outlet tube may be made of low heat conducting material.

The center air outlet tube 56 may be completely eliminated, as shown in FIGURE 8, by using on the inside of the heater tube 38 a double flow pattern which is similar to that which is used on the outside of the heater tube. This double flow pattern may be accomplished by crimping the finned metal cylinder end 58, which is farthest from the closed end of heater tube, in a manner similar to that which is shown in FIGURE 6. Alternatively, crimping of the finned cylinder may be avoided by closing off the previously crimped end by abutting it against the housing. The air inlet and outlet porting would then be suitably arranged so that flow would be from the air inlet port into the internal passage 64 (which includes inner grooves 60) down to the closed end of heater tube 38 and then back along the outer grooves 62 to the outlet port.

The previously described arrangements have the following advantages: (1) All of the fuel must flow along at least one full length of the heater tube 38, regardless of which point it passes through the filter element 36; (2) the average effective flow path of the fuel along the heater tube is three times as great as previously known comparable designs; and (3) large heat transfer surfaces are provided within small volumes.

The several practical advantages, some of which are enumerated above, which flow from my invention, are believed to be obvious from the above description, and other advantages may suggest themselves to those who are familiar with the art to which this invention relates.

Having thus described the various features of the invention, what I claim as new and desire to secure by Letters Patent is:

1. A fluid filtering and heater device comprising a housing having first inlet and outlet ports for passing a first fluid therethrough and second inlet and outlet ports for passing a second fluid therethrough, partition means for separating said first inlet and outlet ports from said second inlet and outlet ports, a filter located in said housing and interposed between said second inlet and outlet ports for filtering said second fluid, a hollow member located downstream of said filter, a pleated element located between and in contact with said filter and said hollow member for dividing said second fluid into relatively thin streams after said second fluid has passed through said filter, means for closing off one end of the trough formed by the outer grooves of the pleated element and causing flow of said second fluid downstream of said filter to be along all of the outer grooves of said pleated element towards one end of said hollow member and then along all of the inner grooves of said pleated element towards the other end of said hollow member, and means for flowing said first fluid into and out of the hollow portion of said member.

2. A fluid filtering and heater device comprising a housing having first inlet and outlet ports for passing an initially hot fluid therethrough and second inlet and outlet ports for passing a second fluid therethrough, partition means for separating said first inlet and outlet ports from said second inlet and outlet ports, a filter of the outside in type located in said housing and interposed between said second inlet and outlet ports for filtering said second fluid, a hollow member located within said filter, said hollow member having an open end and a closed end, a pleated element located between and in contact with said filter and said hollow member for dividing said second fluid into relatively thin streams after said second fluid has passed through said filter, means located at the end opposite the closed end of said hollow member for closing off one end of the trough formed by the outer grooves of the pleated element and causing flow of said second fluid after passing through said filter to be along all of the outer grooves of said pleated element towards the closed end of said hollow member and then along all of the inner grooves of said pleated element towards the other end of said hollow member, and means located within the hollow portion of said member for forming two separated openings and a flow path therebetween, one of said openings communicating with said first inlet port and the other of said openings communicating with said first outlet port.

3. A fluid filtering and heater device comprising a housing having a first chamber formed therein communicating with a first inlet port for permitting ingress of a first fluid, a second chamber formed therein communicating with a first outlet port for permitting egress of said first fluid, a third chamber formed therein for communicating with a second inlet port and a second outlet port for permitting ingress and egress of a second fluid, partition means for separating said chambers from each other, means located in said third chamber and interposed between said second inlet and outlet ports for filtering the fluid flowing therebetween, said last named means including a pair of retainer plates and a porous filter tube having the opposite ends thereof opening through said retainer plates, a hollow non-porous member operatively connected to said housing and located within said filter tube, said member having an open end and a closed end, a pleated non-porous element located between and in contact with said filter tube and said member, said pleated element being crimped at the end opposite the closed end of said hollow member so as to close off one end of the trough formed by the outer grooves of the pleated element and cause flow of said second fluid after passing through said filter tube to be along all of the outer grooves of said pleated element towards the closed end of said hollow member and then along all of the inner grooves of said pleated element towards the other end of said hollow member, and means operatively connected to said housing and located within the hollow portion of said member for forming two separated openings and a flow path therebetween, one of said openings communicating with said first chamber and the other of said openings communicating with said second chamber.

4. A fluid filtering and heater device as defined in claim 3 wherein the means operatively connected to said housing and located within the hollow portion of said member comprises an insert having radially extending spokes in contact with the inner walls of said hollow member, said insert being spaced from the closed end of said member.

5. A fluid filtering and heater device as defined in claim 3 wherein the means operatively connected to said housing and located within the hollow portion of said member comprises a hollow core and a pleated structure located between and in contact with said core and the inner wall of said hollow member, said core and pleated structure being spaced from the closed end of said member and being arranged so that the annulus formed by the core and the inner wall of said hollow member will form the opening communicating with said first chamber and the hollow core will form the opening communicating with said second chamber.

6. A fluid filtering and heater device as defined in claim 3 wherein the means operatively connected to said housing and located within the hollow portion of said member comprises a pleated structure having an inner grooved passageway and an outer grooved passageway, said pleated structure being in contact with the inner wall of said hollow member and being spaced from the closed end of said member, one of said passageways including the opening communicating with said first chamber and the other of said passageways including the opening communicating with said second chamber.

References Cited by the Examiner

UNITED STATES PATENTS

| | | | |
|---|---|---|---|
| 551,794 | 12/95 | Slavin | 165—155 |
| 1,856,771 | 5/32 | Loeffler | 165—86 X |
| 2,362,985 | 11/44 | Brown | 165—154 |
| 2,446,126 | 7/48 | Crake | 210—183 |

FOREIGN PATENTS 389,335  6/08  France.

REUBEN FRIEDMAN, *Primary Examiner.*

HERBERT L. MARTIN, HARRY B. THORNTON, EUGENE F. BLANCHARD, *Examiners.*